United States Patent [19]
Celi

[11] Patent Number: 5,460,195
[45] Date of Patent: Oct. 24, 1995

[54] DEVICE FOR WASHING METAL-CONTAINING SLUDGES

[76] Inventor: Antonio M. Celi, Anagni Localitá Paduni-Casarene, Frosinone, Italy

[21] Appl. No.: 317,579

[22] Filed: Oct. 4, 1994

[30] Foreign Application Priority Data

Oct. 7, 1993 [IT] Italy .................. RM93A0676

[51] Int. Cl.⁶ ...................................... B08B 3/04
[52] U.S. Cl. ...................... 134/108; 134/111; 134/132
[58] Field of Search ........................ 134/65, 108, 111, 134/119, 120, 132, 147, 159, 161; 68/145; 209/198

[56] References Cited

U.S. PATENT DOCUMENTS

| | | | |
|---|---|---|---|
| 847,781 | 3/1907 | Judge et al. | 134/132 |
| 1,435,285 | 11/1922 | Foster et al. | 134/132 X |
| 2,288,742 | 7/1942 | Rangohoff | 134/65 |
| 2,314,871 | 3/1943 | De Back | 134/65 |
| 3,243,264 | 3/1966 | Hickey | 134/65 X |
| 3,961,637 | 6/1976 | Owen, Sr. | 134/159 X |
| 4,445,523 | 5/1984 | Bruning et al. | 134/65 |
| 4,848,107 | 7/1989 | Stoll | 68/145 X |

FOREIGN PATENT DOCUMENTS 67501  6/1989  Italy.

*Primary Examiner*—Philip R. Coe
*Attorney, Agent, or Firm*—Young & Thompson

[57] ABSTRACT

A device for washing metal-containing sludges, comprising a screw feeder cylinder bearing blades placed between the turns and rotatably supported in both senses on its horizontal axis within a fixed cylinder containing a washing fluid. The fluid is circulated between the inside of the screw feeder cylinder and the gap between the same and the fixed cylinder. The exhausted washing fluid is removed and is replaced within the fixed cylinder by fresh washing fluid, according to the adjustment of a level control. The screw feeder cylinder is caused to rotate in both senses so as to cause the sludge to be washed to go forward and backward so meeting the washing fluid inside the cylinder itself according to a predetermined washing program. After such a program has been completed, the sludge now washed is removed after filtering.

1 Claim, 3 Drawing Sheets

DEVICE FOR WASHING METAL-CONTAINING SLUDGES

FIELD OF THE INVENTION

This invention relates to the field of metal-containing sludge washing.

More particularly, this invention relates to a device for washing metal-containing sludges.

BACKGROUND OF THE INVENTION AND PRIOR ART

Needs, both of environment and economic nature, of processing metal-containing sludges regardless of their origin, are widely known, in order to make such sludges no longer toxic and to recover metals which would be lost with them.

Said sludges, even if they are placed in discharge places that meet the environment necessities, are always a pollution danger of water-bearing strata and a resource waste which resources when exhausted will not be available. As stated above, "even if", because there are not sufficient safe discharge places and not all the sludges finish to a discharge place.

Therefore, the Applicant of this application had already suggested previously a method and device for treating such sludges in the Italian Patent no. 1,232,862, entitled "Metodo e Dispositivo per il Trattamento di Fanghi Contenenti Residui Metallici", (A Method and Device for Treating Metal Residue-Containing Sludges), issued on Apr. 30, 1992 (corresponding application number 67501-A/89 of Jun. 20, 1989).

Briefly, in such patent it was foreseen for metal-containing sludges a washing in equicurrent in a rotating chamber which rotates in a one sense.

However, the yield of such kind of washing was not completely satisfying, or it was not much efficient and sludge contained appreciable traces of metals.

OBJECTS OF THE INVENTION

It is the object of this invention to provide a device which allow to wash metal-containing sludges in a substantially complete way and in time which is economically valuable.

By "substantially complete" it is meant in this disclosure that the sludge can contain metal traces just up to a few milligrams by kilogram.

Such object is attained, according to the teaching of this inventione, by means of the use of a washing chamber that is caused to rotate in both senses, which is provided in its inner part with means to cause its sludge content to go forward and backward, depending on the rotation sense, such means being made up of an Archimedean screw or screw, and of sludge lifting means, made up of blades placed between the turns of said screw feeder.

In such chamber a washing means is delivered, in correspondence to an end, which washing means is made up of a liquid or solution suitable to absorb as much metal as possible. Sludges which are to be washed so become mixed with such liquid or solution, as well as shaken in the washing liquid in intimate and strong manner due to the rotation in both senses and the consequent displacement forward an backward, as well as to the lifting and falling caused by the blades.

SUBJECTS OF THE INVENTION

Therefore, according to a first aspect the present invention refers to a device for washing metal-containing sludges.

This device comprises a screw feeder cylinder bearing blades which are placed between the turns of said screw feeder, the cylinder being arranged horizontally within a fixed envelope and rotatably in both senses;

driving means for causing said screw feeder cylinder to rotate so as to cause the sludge to be washed to go forward and backward, toward an inlet end and outlet end, as well as to be shaken inside said cylinder;

said fixed envelope containing the fluid for washing the sludge;

means being supplied for circulating and heating said washing fluid between said fixed envelope and said screw feeder cylinder, and means for feeding to and removing from said fixed envelope said washing fluid, according to the adjustment of a level control, the fluid communication from the screw feeder cylinder to the fixed envelope being carried out by means of a filtering head, and comprising collection means and removal means for the washed sludge, as well as means for programming the washing strength and the washing times, and means for programming the amount of the washing fluid, the amount of sludge to be introduced and the quantity of residual sludge to be removed per unit time.

ADVANTAGES OF THE INVENTION

This invention offers the main advantages consisted of substantially completely (with residual traces at most up to a few milligrams per kilogram) washing metal-containing sludges in a time that is economically valuable; moreover, it allows to use washing solutions obtainable from electronic or galvanic industry by-products, and such solution can be regenerated, when it is metal riched, so as to be indefinitely reutilized.

BRIEF DESCRIPTION OF THE DRAWINGS

This invention will be better understood on the basis of the following detailed description of its preferred embodiment, which is given just for exemplificative, and absolutely no limitative, purpose, with reference to the accompanying drawings, wherein.

DETAILED DESCRIPTION OF THE PREFERRED EMBODIMENT OF THE INVENTION

Figure 1:
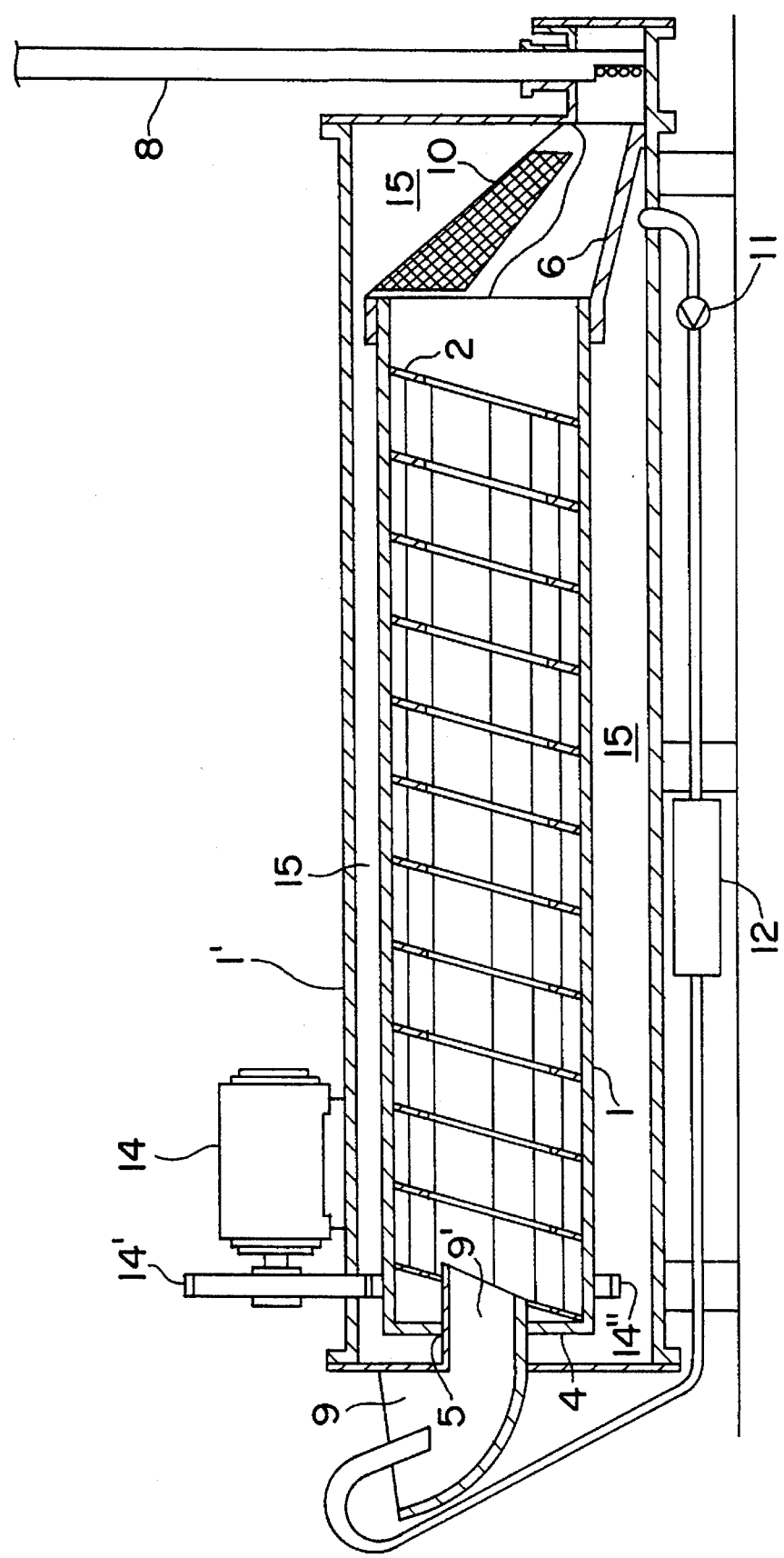
FIG. 1 is a longitudinal sectional view of a device for washing metal-containing sludges according to this invention.

As it is possible to see in FIG. 1, inside a cylinder 1 horizontally placed, having a diameter and length suitable to the purpose, the helical band of a screw feeder 2 is fixed, on the inner surface of said cylinder 1, so that the cylinder 1, which rotates on its own axis, assumes the functions of a screw feeder or Archimedean screw. Therefore, in the following of this disclosure the cylinder 1 is indicated as screw feeder cylinder. The pitch and length of the helical band 2 are suitable to the purpose.

Figure 2:
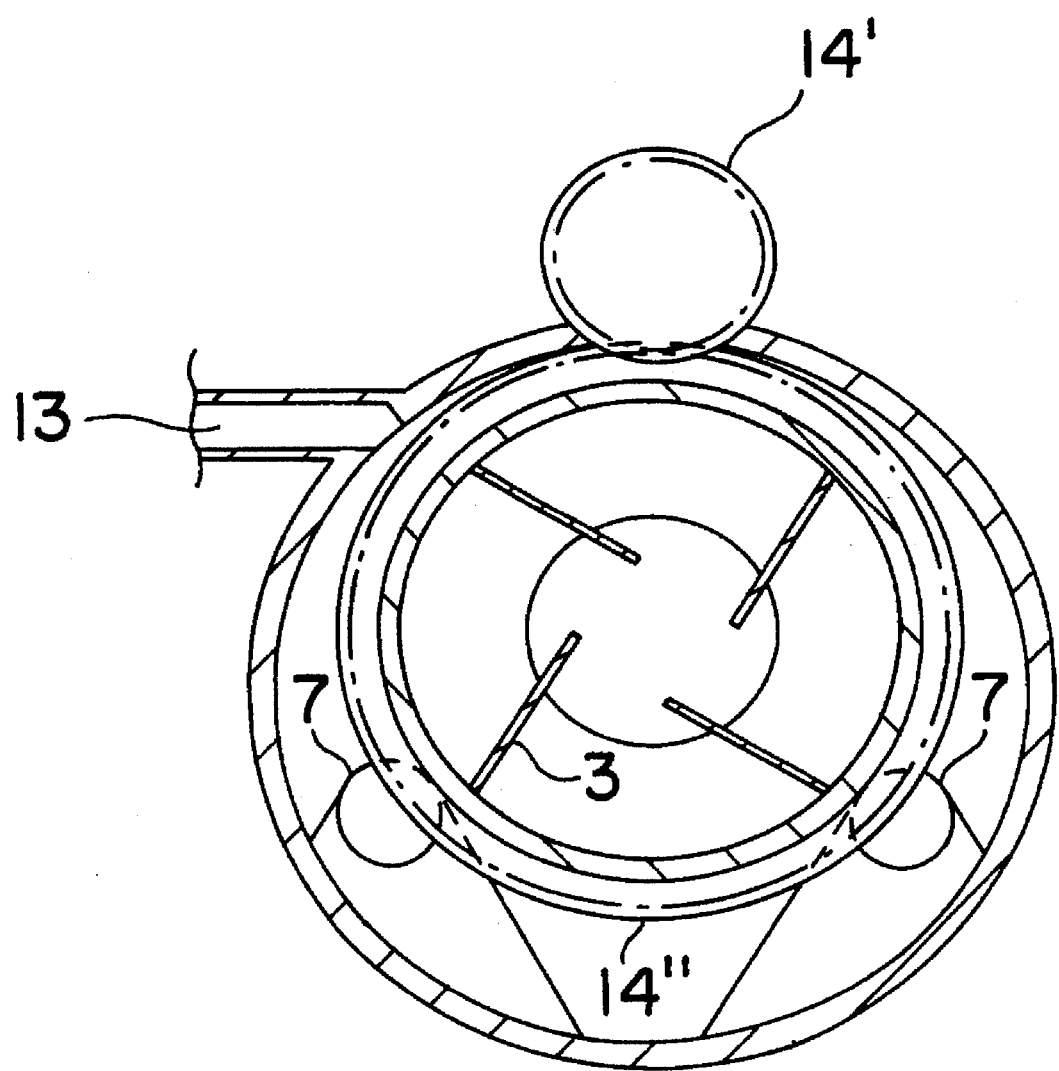
FIG. 2 is a transverse cross sectional view of the same.

As it is possible to see in FIG. 2, sequence of lifting blades 3 is placed, in the longitudinal sense radially at 120°, having a slightly larger width than that of the helical band 2.

The screw feeder cylinder 1 is closed on a side by a disk 4 having a predetermined depth, which disk bears in the middle a hole 5 having a suitable size, in which the opening 9' of a funnel for loading sludges is lodged in a movable, but sealed manner. To close the screw feeder cylinder on the other side, it is the task of a filtering head/collector 6, also here in a movable, but sealed manner.

The screw feeder cylinder 1 can freely rotate on itself, in both senses on its own axis, supported by the load-bearing wheels 7 (see FIG. 2) inside and eccentrically upwards a fixed load-bearing cylinder 1'. The fixed load-bearing cylinder 1' also contains a washing liquid or solution. The filtering/collector head 6 is supported by the fixed load-bearing cylinder 1' and acts like a closure means for it. A screw feeder 8, vertically placed, for the sludge residue discharge, is connected to the head collector 6. The other side of the fixed load-bearing cylinder 1' is sealed closed by a head where, the funnel 9 for loading sludges is lodged, in an eccentric manner upward, whose opening 9', as it is pointed out above, ends inside the screw feeder cylinder 1.

The fixed load-bearing cylinder 1' and the screw feeder cylinder 1 communicate each other just through the filter 10, having a suitable surface, placed on the filtering/collector head 6.

The device is provided with a circulating pump 11, downstream of which a heat-exchanger 12 is located, which heat-exchanger is connected to the funnel for loading the sludges which are to be washed 9. In such a way, the washing liquid or solution is sucked by the fixed load-bearing cylinder 1' at the more suitable point, heated and reintroduced in the screw feeder cylinder 1, from which through the filter 10 it will flow, being replaced by other liquid continuously introduced in the device, in the fixed load-bearing cylinder 1'. From here, through a level opening 13 of which the fixed load-bearing cylinder 1' is provided (see FIG. 2), the washing liquid or solution leaves the device.

An electric motor 14 having a suitable power causes a gear wheel 14' to rotate engaged to a toothing 14" which is provided on the periphery to the screw feeder cylinder 1 in one sense or in the other sense.

The disclosed device operates as it follows.

The washing solution, as for instance ammonium chloride or ammonium sulfate, depending on the sludge condition (see infra), is fed into the gap 15 between the fixed load-bearing cylinder 1' and the screw feeder cylinder 1, and from here it is conveyed by means of the pump 11 to the screw feeder cylinder 1 through the opening 9'.

By means of the same opening the metal-containing sludge which is to be washed is fed in the screw feeder cylinder 1.

Depending on the amount of metal or metals present in the sludge, the residence time of the sludge in the screw feeder cylinder 1 is determined, that notwithstanding it is a continuous treatment and, depending on the sludge nature, a washing program is established so as the washed sludge residue at the end of the treatment is substantially free of metal or metals (by "substantially free" it is meant that just a few milligrams per kilogram might be present in it). That is obtained, in addition to the effect of the washing solution, by the the residence time and the treatment strength, or better the washing strength, of sludges in the device, in the terms defined in the following.

The screw feeder cylinder 1 acts as a washing chamber. As it has been pointed out above, it can rotate in both senses, therefore as a screw feeder it can carry its solid contents from one end to the other end, as well as, because it has its ends closed, it can shake rather than displace its liquid contents. Due to the lifting blades 3 radially placed between the spiral threads which the screw feeder cylinder has at its disposal, said screw feeder cylinder 1 can lift, in both rotation senses, its solid contents and then cause it to fall again into the liquid, or it can shake or stir, or beat when it is rapid enough, its liquid contents.

In the present description by "washing strength" it is meant the total number of revolutions on itself of the screw feeder cylinder-washing chamber 1, as a sum of the number of revolutions in one sense and of the number of revolutions in the opposite sense, per unit time.

In the present description by "washing time" of the sludge is meant the different between the number of revolutions on itself of the screw feeder cylinder-washing chamber 1 in one sense and the number of revolutions in the opposite sense per unit time (conveyance of sludge toward the discharge collector 6/conveyance of sludge toward the loading opening 9).

A programming unit provided to the device allows to select and fix, according to needs, the washing time and strength of the sludge, as well as, once they have been determined, to fix and keep during the treatment at a constant level the amount of washing solution and the amount of sludge which are to be introduced in the device, as well as the amount of residue which is removed, per unit time, as well as to keep the washing solution inside the device at a predetermined temperature.

The washing solution once it has been loaded with metal or metals removed from the sludge on treatment flows outside the device through the level opening 13 (see FIG. 2), of course being replaced by a fresh solution.

It is particularly foreseen that the washing solution metal containing at the device outlet goes into a storage reservoir from which by means of a pump having a suitable capability and power it passes through a filter candle wherein it is cleared from any residue traces of sludge, and from which it is conveyed to a subsequent storage reservoir wherein it will wait for being conveyed to a process suitable to clear the same from metals in its contained, and in the case it would be necessary, to regenerate the same, so as it can be returned afterward to the washing device for realizing its functions.

The device as well as the tanks and storage reservoirs are provided with vents connected to a vent air washing system, in order to avoid environment pollution.

After having disclosed the construction and operation of a device for washing metal-containing sludges according to the teaching of this invention, now we can go to illustrate a process involving the use of such kind of device, that constitutes the second aspect of the present invention.

The steps of the process for washing metal-containing sludges according to the present invention are:

1) washing by means of the device disclosed above employing a suitable washing liquid or solution;

2) drying of the sludge residue;

3) washing again for neutralizing the dried residue; and 4) drying again the neutralized residue.

1) Washing.—The washing solution which is at present employed is ammonium chloride, from a spent engraving solution or exhausted solution from electronic industry. This solution, according to the metal or metals present in the sludge which is to be washed, is enriched of other chemical agents, also these agents almost always being galvanic, electronic or other industry wastes, particularly not purified hydrogen peroxide, an electronic industry waste, which is re-employed in the present process as an oxidizer.

2) Drying the sludge residue.—A vacuum web filter, which is placed upstream the discharge screw feeder for the sludge of the washing apparatus, allows:

2.1—pressing under vacuum the mass after filtering under vacuum;

2.2—washing the mass after it has been under vacuum pressed, and 2.3—pressing again the mass after having again filtered it under vacuum, so as to obtain sludge which is drenched of washing water at a minimum, and not of washing solution.

3. Neutralizing washing again of the residue. In a washing device of the type disclosed above, but having somewhat reduced sizes in comparison with that employed in the step 1, a washing is carried out no more with the ammonium chloride solution, but with an ammonium sulfate solution. The ammonium sulfate, a fertilizer substance, so will clear the residue mass of any metal traces still present in the same. The sludge residue now drenched with ammonium sulfate, therefore of a fertilizer, is conveyed to the next step.

4. Drying again upon repetition of the steps from 2.1 to 2.3.

Upon authorization by the qualified Authorities, it is possible to use the residue, now slightly drenched with fertilizer, as a product suitable to counteracet the excess acidity of woodlands.

The copper sulfate solution can be used, always being circulating, many times, because the amount of metal or metals it has to absorb is a minimum amount. This solution once it is exhausted, that is to say no longer suitable to absorb other metal, will be treated as it would be a normal metal engraving solution.

Upon recovering the same by means of a suitable process, the pure washing solution and metal or metals are obtained.

Figure 3:
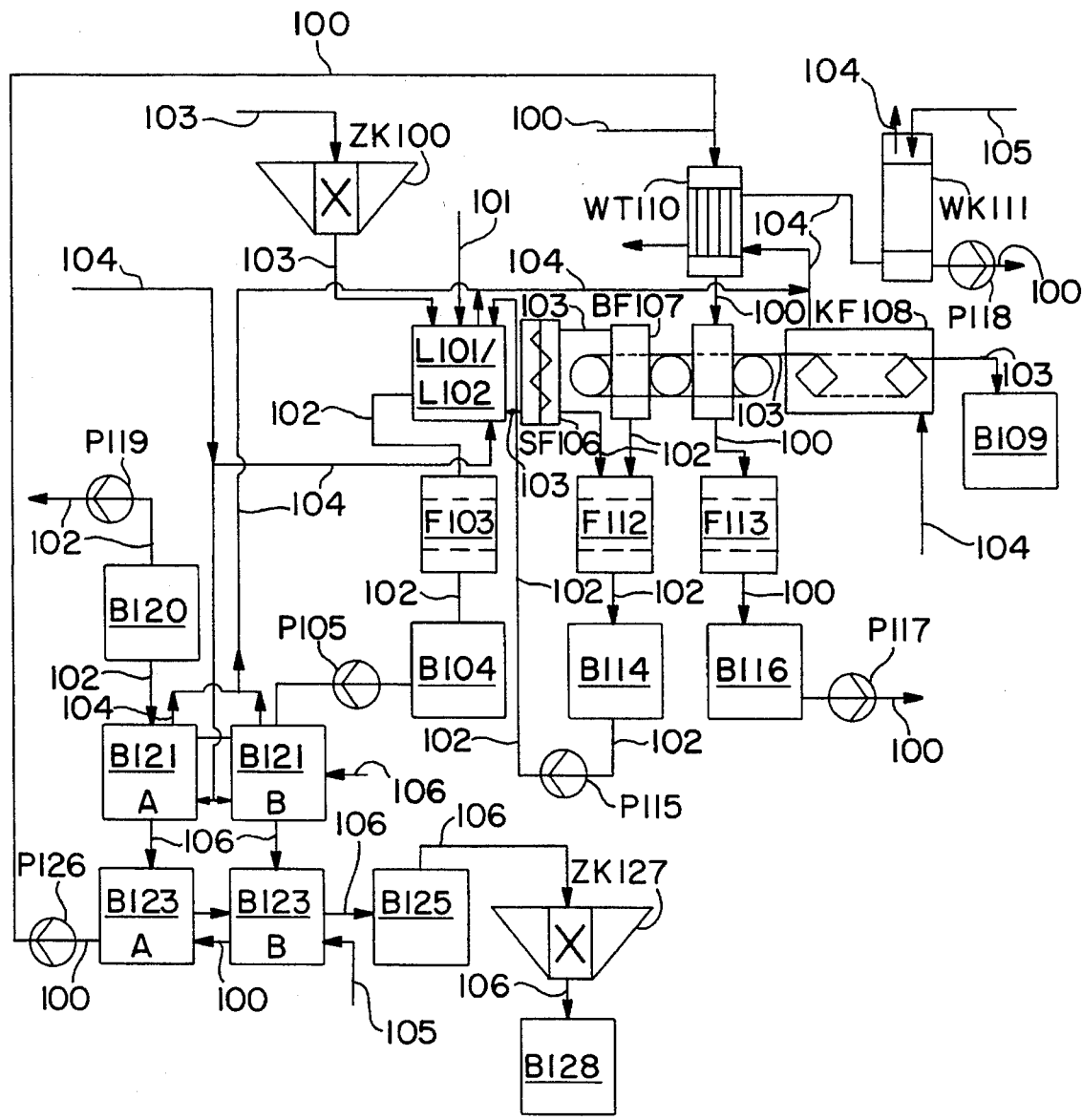
FIG. 3 is a flow chart of the process for washing metal-containing sludges according to the present invention.

With reference now to FIG. 3, now a treatment line of sludges is illustrated which realizes the process according to the present invention.

At the line inlet there is the material to be processed, or better the metal-containg sludge to be washed, whose flow is indicated by the reference number 103.

It first goes into a grinding and metering machine 2K100, continuously operating, and it is conveyed from it to a washing drum L101 or L102, having a volume of 10,000 liters, contiuously operating under a working pressure of 1 bar at a maximum temperature of 60° C., which is made up of a washing device according to this invention, as disclosed above. Into the washing drum a washing solution enters, whose flow is indicated by the reference number 101. From this drum the exhausted solution, no longer suitable to absorb metals, whose flow is indicated by the reference number 102, goes out.

At the washing drum inlet there is also air, whose flow is indicated by the reference number 104. It also represents a washing drum outlet, as vent air that is then washed to avoid the environment pollution.

The sludge leaving the washing drum is delivered to a spiral conveyor SF106 from which it is conveyed to continuous web filters 8F107, meeting a water solution of ammonium sulfate and ammonia, coming from a heat exchanger that make it to enter, to reach then, by means of a chain conveyor KF108, a storage tank B109. On the chain conveyor KF108 the sludge is caused to meet warm air 104, which air is carried to the inlet of a steel and graphite vertical cylinder heat-exchanger having a 200 liters capacity, which operates continuously under a working pressure of 10 bar, at a maximum temperature of 120° C. To that heat exchanger is also conveyed the vent air of the washing drum L101, L102. Returning now to the spiral conveyor SF106, from it the exhausted solution 102 flows out that then is conveyed through two steel and graphite vertical cylinder bag filters F112 batchwise operating having a volume capacity of 5000 liters per hour under 1 bar pressure and at a maximum temperature of 50° C. From here the solution 102 passes to a horizontal rectangular passage tank B114 of 1000 liters capacity under 1 bar pressure at a maximum temperature of 50° C. batchwise operating, and then by means of a magnetic joint pump 115 having a capacity by volume of 5 liters per minute it is delivered back to the washing drum inlet.

Returning to the heat exchanger WT110, air 104 comes out of it which air is conveyed to a vertical cylinder washing column WK111 continuously operating, to whose inlet distilled water 105 is fed. The air and distilled water meet each other in countercurrent.

This invention has been disclosed with reference to a specific preferred embodiment of the same, but it is to be expressly understood that the stated details are given just for exemplification purpose and they are passible of a considerable width of modifications, additions and/or omissions, without going out of the scope of the original presented teaching.

Therefore, the protection scope of this invention is designed to be limited just according to what is stated in the appended claims.

I claim:

1. A device for washing metal-containing sludges, said device being characterized in that it comprises:

a screw feeder cylinder (1) bearing lifting blades (3) placed between the turns (2) of said screw feeder, the cylinder being arranged horizontally within a fixed envelope (1') and rotatably in both senses;

driving means (14, 14', 14") for causing said screw feeder cylinder (1) to rotate so as to cause the sludge to be washed to go forward and backward inside the cylinder, and to be shaken in the same;

said fixed envelope (1') containing the fluid for washing the sludge, means being supplied for circulating (11) and heating (12) said washing fluid between said fixed envelope (1') and said screw feeder cylinder (1), and means for feeding and removing said washing fluid toward said fixed envelope and from said fixed envelope, according to the adjustment of a level control (13);

the fluid communication from the screw feeder cylinder (1) to the fixed envelope (1') being carried out by means of a filtering head (10), and comprising collection means (6) and removal means (8) for the washed sludge, as well as means for programming the washing strength and the washing times of sludge, and means for programming the amount of the washing fluid, the amount of the sludge to be introduced as well as of the amount of residual sludge to be removed per unit time.

\* \* \* \* \*